(12) United States Patent
Turpin et al.

(10) Patent No.: US 11,288,218 B2
(45) Date of Patent: Mar. 29, 2022

(54) UNIFIED NETWORK INTERFACE FOR INDUSTRIAL NETWORKS

(71) Applicant: Analog Devices, Inc., Wilmington, MA (US)

(72) Inventors: Troy S. Turpin, Albuquerque, NM (US); Samantha L. Jaramillo, Albuquerque, NM (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

(21) Appl. No.: 17/103,257

(22) Filed: Nov. 24, 2020

(65) Prior Publication Data

US 2021/0157758 A1  May 27, 2021

Related U.S. Application Data

(60) Provisional application No. 62/941,063, filed on Nov. 27, 2019.

(51) Int. Cl.
*H04L 67/12* (2022.01)
*G06F 13/38* (2006.01)
*G06F 13/42* (2006.01)

(52) U.S. Cl.
CPC ........ *G06F 13/387* (2013.01); *G06F 13/4221* (2013.01); *G06F 13/4282* (2013.01); *H04L 67/12* (2013.01)

(58) Field of Classification Search
CPC ............... G06F 13/387; G06F 13/4221; G06F 13/4282; H04L 67/12
See application file for complete search history.

(56) References Cited

U.S. PATENT DOCUMENTS

| 7,805,533 | B2 | 9/2010 | Burns et al. |
| 8,838,869 | B1 * | 9/2014 | Puranik ............... G06F 13/4022 |
| | | | 710/315 |
| 2004/0151175 | A1 * | 8/2004 | Moll ....................... H04J 3/22 |
| | | | 370/389 |
| 2005/0197017 | A1 * | 9/2005 | Chou ............... G06K 19/07733 |
| | | | 439/660 |
| 2015/0365356 | A1 * | 12/2015 | Liaw ................... H04L 49/3009 |
| | | | 370/466 |

* cited by examiner

*Primary Examiner* — Henry Tsai
*Assistant Examiner* — Harry Z Wang
(74) *Attorney, Agent, or Firm* — Schwegman Lundberg & Woessner, P.A.

(57) ABSTRACT

Systems and methods for interfacing an application circuit to an industrial network include first and second interfaces, one or more controllers, and one or more memory devices. The one or more memory devices store instructions, which when executed, cause the controllers perform operations to convert messages between a specified message format according to a protocol of the industrial network and a protocol agnostic format.

17 Claims, 7 Drawing Sheets

| SECTION | SYNCHRONIZATION HEADER | | | MESSAGE | | | | |
|---|---|---|---|---|---|---|---|---|
| | CHECK/LENGTH | | CHECK/LENGTH INVERSE | | MESSAGE HEADER | | | DATA | CRC |
| FIELD | CHECK CODE | LENGTH | CODE INVERSE | LENGTH INVERSE | TYPE | FLAGS | DATA LENGTH | DATA | CRC |
| SIZE (BITS) | 4 | 12 | 4 | 12 | 8 | 8 | 16 | n*8 | 16 |
| SIZE (BYTES) | 2 | | 2 | | 1 | 1 | 2 | n | 2 |

UNIFIED NETWORK INTERFACE FOR INDUSTRIAL NETWORKS

CLAIM OF PRIORITY

This application claims priority to U.S. Provisional Application Ser. No. 62/941,063, filed Nov. 27, 2019, which is hereby incorporated by reference herein in its entirety.

TECHNICAL FIELD

This document pertains generally, but not by way of limitation, to network communication, and particularly but not by way of limitation to a unified interface for use in industrial networks.

BACKGROUND

Industrial networks, such as those that employ industrial Ethernet, may be implemented using one of several network protocols. When developing applications for use with industrial networks, engineers must interface the application with each network protocol that may be used. This may require several different complex integrations to accommodate use of the application on various different industrial networks.

SUMMARY

The present inventors have recognized, among other things, that it can be desirable to provide a protocol agnostic interface between applications and industrial networks. A unified interface circuit(s) may include one or more controllers and may be configured to implement an abstraction layer and a messaging layer in addition to the conventional software stack used to interface with a respective network. The abstraction layer may interface with the conventional network protocol stack and the messaging layer may be configured to transmit and receive protocol agnostic messages to and from an application. The messaging layer and the abstraction layer may interface to transfer data between protocol agnostic messages and network protocol messages. This way, applications can be implemented using protocol agnostic messaging to interface with several different industrial network protocols, eliminating the need for customization of the application interface for each different protocol.

Industrial Ethernet, for example, requires a software interface and software architecture required by the Industrial Ethernet stack that varies drastically from protocol to protocol. This may present a significant challenge to engineers developing applications for use on Industrial Ethernet networks that support a variety of industrial protocols. In this example, integration of the application layer with a communication layer for a given Industrial Ethernet protocol is a custom effort with little to nothing in common with the integration for other protocols. This repeated custom development may be slow, error-prone and difficult, extending time-to-market for applications. By using the unified interface, the application layer can be programmed once for use by several different network protocols.

In an example, a system for interfacing an application circuit to an industrial network, the industrial network having a specified message format for messages transmitted on the industrial network, includes a first interface, a second interface, one or more controllers, and one or more memory devices. The first interface is connected to the industrial network to transmit signals on, and receive signals from, the industrial network. The second interface is connected to a communication link to transmit signals on, and receive signals from, the communication link to communicate data with the application circuit. The one or more memory devices store instructions, which when executed, cause the controllers perform operations including: extracting network data packaged in messages of the specified message format received via the first interface; generating messages in a protocol agnostic format different than the specified message format, wherein the protocol agnostic format is the same for a plurality of different link types of the communication link; transmitting the messages in the protocol agnostic format on the communication link via the second interface; extracting link data packaged in messages having the protocol agnostic format received from the application circuit via the second interface; generating messages in the specified message format that include the link data; and transmitting the message in the specified format to the industrial network via the first interface.

In another example, a method for providing an interface between an industrial network and an application circuit, the industrial network having a specified message format for messages transmitted on the industrial network according to a protocol of the industrial network, includes receiving, by a unified interface circuit, messages from the industrial network in the specified message format; extracting network data from the messages using the protocol of the industrial network; generating one or more messages in a protocol agnostic format different than the specified message format, and transmitting, over a communication link, the one or more messages in the protocol agnostic format from the unified interface circuit to the application circuit separate from the unified interface circuit, wherein the protocol agnostic format is a same format for a plurality of different link types of the communication link.

In another example, a method of providing an interface between an application circuit and an industrial network, the industrial network having a specified message format for messages transmitted on the industrial network according to a protocol of the industrial network, includes by a unified interface circuit, messages having a protocol agnostic format from an application circuit separate from the unified interface circuit and over a communication link, wherein the protocol agnostic format is a same format for a plurality of different link types for the communication link; extracting one or more data items from the messages having the protocol agnostic format; generating a plurality of network messages in the specified message format for the protocol of the industrial network, the plurality of network messages generated using the data items; and transmitting, by the unified interface circuit, the plurality of network messages on the industrial network.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 is a diagram illustrating an example message format for industrial protocol agnostic messages.

DETAILED DESCRIPTION

A unified network interface is disclosed herein that facilitates communication between an application and an industrial network using any of several different industrial network protocols. A unified interface circuit(s) of the unified network interface may include one or more controllers and may be configured to implement an abstraction layer and a messaging layer in addition to the conventional software stack used to interface with a respective industrial network. The abstraction layer may interface with the conventional network protocol stack and the messaging layer may be configured to transmit and receive protocol agnostic messages to and from an application. The messaging layer and the abstraction layer may interface to transfer data between protocol agnostic messages and network protocol messages.

The abstraction layer may receive data objects from the application programming interface (API) of the industrial protocol stack in a format governed by the stack and protocol. The protocol-specific data objects may be understood by the abstraction layer, unpacked, and converted to one or more data items that are defined by a common (i.e., protocol-agnostic) data object model. The conversion of the protocol-specific data to common data item(s) may be governed by user-configured device and item structures. This common data object model may be understood by a common interface with which the messaging layer interfaces. The messaging layer may retrieve the common object data and place it in messages in the second identified format for transmission to the application.

The messaging layer may receive data from one of several link types (in a same format regardless of link type) and place the data in one or more data items that are defined by a common data object model. These data items may then be supplied to the abstraction layer for conversion to data objects that are defined by a protocol-specific object model. The conversion of the common object data to a protocol-specific object data may be governed by user-configured device and item structures. The abstraction layer may then provide the protocol-specific objects to the protocol stack via the API of the protocol stack.

Figure 1:
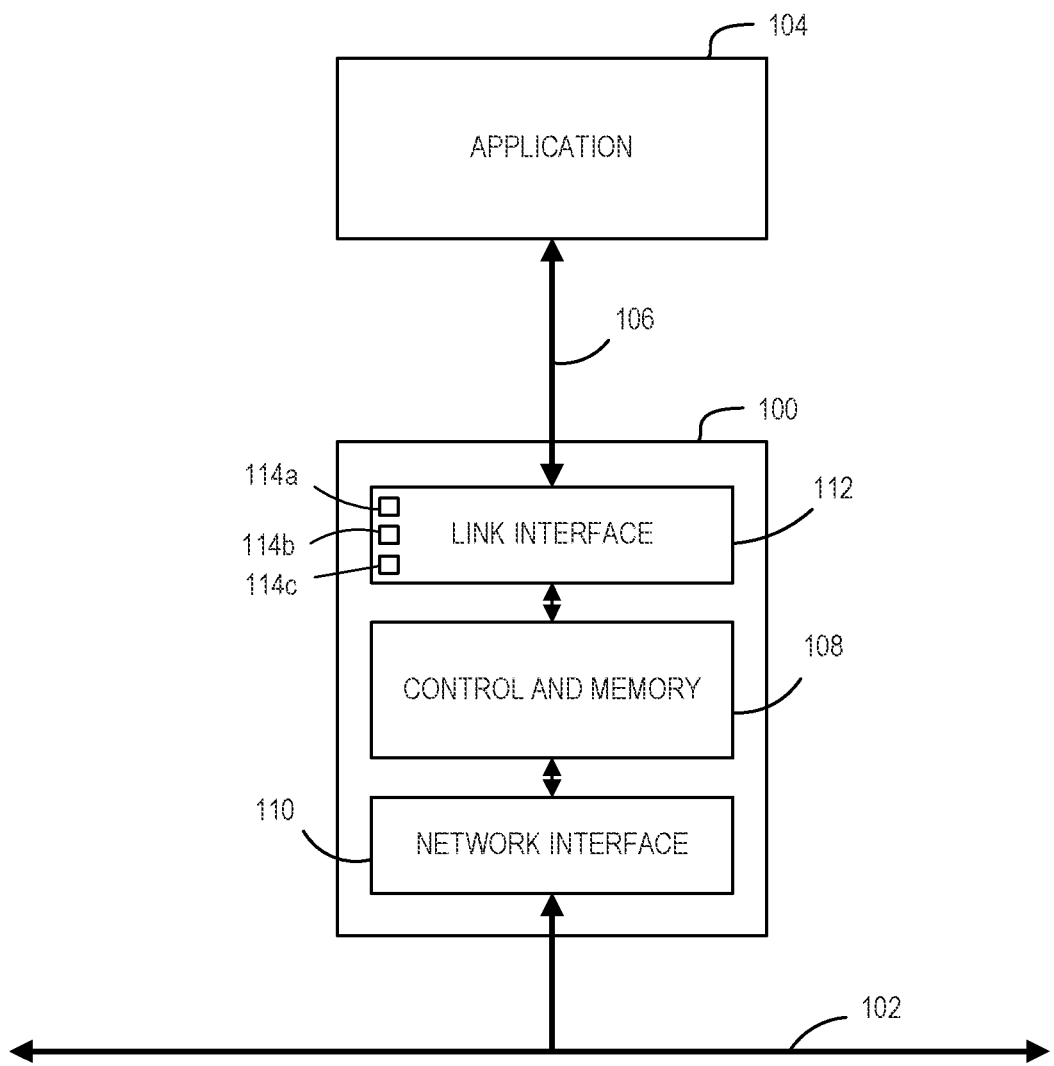
FIG. 1 is a diagram illustrating a unified network interface connected between an industrial network and an application.

FIG. 1 is a diagram illustrating a unified network interface 100 connected between an industrial network 102 and an application 104. The unified network interface 100 connects to transmit and receive data to and from the application 104 over a communication link 106. The unified network interface includes a control and memory circuit 108, a network interface 110, and a link interface 112. The network interface 110 is connected to transmit and receive data to and from the industrial network 102. The industrial network 102 may be an industrial Ethernet network, for example, such as an EtherCAT network, an EtherNet/IP network, a process field network (PROFINET), an Ethernet Powerlink network, a Sercos III network, a CC-Link network, a Modbus TCP network, or any other industrial network. In an example, the network interface 110 may include one or more Ethernet switches, for example, one or more physical connectors, one or more physical layer chips, and any other hardware and/or software components configured for communication with the industrial network 102. For example, the network interface 110 may include multiple physical connectors each for connecting to a different respective Industrial Ethernet network type.

The communication link 106 can be selected using any link type, including Universal Asynchronous Receiver/Transmitter (UART), Ethernet, Inter-Integrated Circuit (I2C), Serial Peripheral Interface (SPI), or any other link type. The link interface 112 may be configured to identify the link type and accept messages over any one of the link types. The protocol agnostic messages transmitted between the application 104 and the unified network interface 100 may be of a same format regardless of the link type of the communication link 106. This allows application developers to select whatever communication link type is most desirable for interfacing with the unified network interface 100.

The link interface 112 may include any number of physical connectors to connect the unified network interface 100 to a respective communication link 106. The link interface may also include pins 114a-114c, which may be used to specify a link type for the communication link 106. Any number of pins may be used to specify any number of link types. Using the pins 114a-114c, the link type used for the communication link 106 may be selected at boot time of the unified network interface 100 by sampling the pins 114a-114c that are set to indicate the desired link type. In one example, sampling the pins 114a-114c during boot of the system will lock in the link type code which cannot be changed without resetting the system. The link type code will be used to select the link type for the unified network interface 100.

When transmitting messages over the communication link 106, the link interface 112 may implement a link porting layer configured to transmit and receive data from any of several different link types for the communication link 106. For example, the link porting layer may implement lower layer hardware interfacing to use an identified link type to transmit the protocol agnostic messages using the identified link hardware. For example, if the link porting layer receives an indication that the link is an Ethernet link, the link porting layer will package the messages into Ethernet frames for transmission across the communication link 106. This may be accomplished for any number of link types such that the control and memory circuit 108 need not be aware of the link type when providing protocol agnostic messages to the link porting layer for communication over the communication link 106.

The control and memory circuit 108 may include, for example, one or more application-specific or general-purpose processor circuits. Such circuits can include system-on-chip (SoC) realization or such circuits can be field-programmable. In some examples, the control and memory circuit 108 can include any number of controllers including field-programmable gate arrays (FPGAs), digital signal processors (DSPs), microprocessors, application specific integrated circuits (ASICs) or other digital logic circuits.

The control and memory circuit 108 can also include one or more volatile or non-volatile memories. For example, the control and memory circuit 108 can include one or more non-volatile memories including read-only memories (ROMs), flash memories, solid state drives, or any other non-volatile memory, and one or more volatile memories including, for example, static or dynamic random-access memories (RAM).

The application 104 may be any industrial application including one or more motors, sensors, robotics, automated machinery, and the like. The application 104 may include any number of circuits and/or controllers that implement an application layer configured to control and/or monitor physical properties of the application 104. The application layer may also be configured to receive instructions from, and report data to, the network 102. To accomplish this task, the application layer implemented by the application 104 may be configured to transmit and receive protocol agnostic messages on the communication link 106. The messages transmitted by the application 104 on the communication link 106 are protocol agnostic, using a same format regardless of the protocol of the network 102 and the link type of the communication link 106.

The unified network interface 100 receives the protocol agnostic messages from the application 104, extracts the data from the messages, and generates messages using the data and having a protocol of the network 102 for transmission on the network 102. Likewise, the unified network interface 100 receives messages from the network 102 in the protocol of the network 102, extracts data from the network messages, generates protocol agnostic messages using the data, and transmits the protocol agnostic messages to the application 104 over the communication link 106. The unified network interface 100 accomplishes these tasks by implementing a communication layer as illustrated and described below with respect to FIG. 2. The communication layer may be implemented using the control and memory circuit 108 in hardware and/or software. For example, instructions may be stored within one or more memory units of the control and memory circuit 108 that when executed by one or more processors or controllers of the control and memory circuit 108 cause the unified network interface 100 to execute the communication layer.

The unified interface 100 may be configured to connect to any industrial network, for example, regardless of protocol. Thus, the application 104 can connect, through the unified network interface 100, to several different types of Industrial networks (such as various types of Industrial Ethernet networks) while only being required to communicate using the protocol agnostic messages. This significantly simplifies the configuration of the application 104 for network communication, reducing the chance for errors, and reducing the time-to-market for systems that include the unified network interface 100 and the application 104. This may be accomplished by the unified interface 100 by loading an appropriate software package based on a protocol of the network 102 to which the unified network interface 100 is currently connected.

Figure 2:
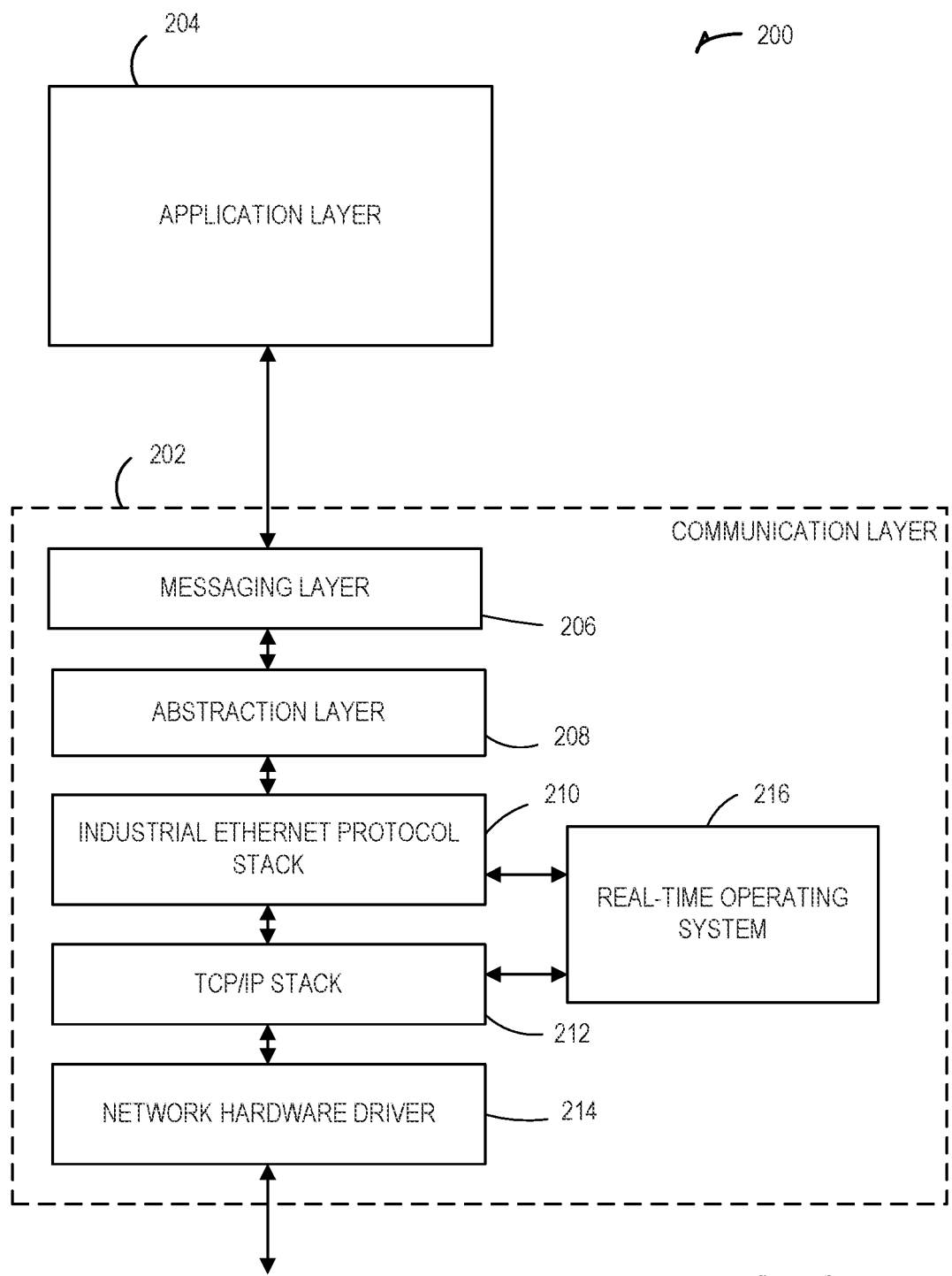
FIG. 2 is a diagram illustrating a logical implementation of a communication layer of a unified network interface.

FIG. 2 is a diagram illustrating a logical implementation 200 of a communication layer 202 of a unified network interface. The communication layer 202 may be implemented by the control and memory circuit 108 of the unified network interface 100, for example, and the application layer 204 may be implemented by the application 104. The communication layer 202 includes a messaging layer 206 and an abstraction layer 208. The communication layer 202 also includes the conventional network protocol stack which may include the industrial Ethernet protocol stack 210, the TCP/IP stack 212, a network hardware driver 214, and a real-time operating system 216. The industrial Ethernet protocol stack 210 may implement an API for providing and receiving data to and from the stack. The TCP/IP stack 212 and the network hardware driver 214 may be implemented to control receipt and transmission of data on the physical network. For some network protocols, the TCP/IP stack 212 and the real-time operating system 216 may not be needed and thus, may not be included in the software build for that respective protocol. Likewise, any additional software components may be added/removed based on the needs for the respective network protocol.

In conventional systems, the application layer 204 and the communication layer 202 are both implemented by the application 104 on common hardware, requiring the developer of the application 104 to integrate the application 104 with the specific network protocol of the industrial network. If the application 104 is to be used on several industrial networks, the application developer must integrate the application with each different network protocol. In the embodiments illustrated in FIGS. 1 and 2, however, the communication layer 202 is implemented on a separate system (the unified network interface 100) than the application layer 204 (the application 104), which are connected to communicate using the communication link 106. This allows the developer of the application 104 to integrate the application one time to interface with the unified network interface using the protocol agnostic messages, rather than for each different network protocol. The unified network interface then handles communication between the application and each different network protocol.

The messaging layer 206 may be configured to transmit and receive the protocol agnostic messages on the communication link 106, for example. The format of the protocol agnostic messages may be any format defined for the communication layer 202, such as shown in FIG. 4. In an example, a data frame for a protocol agnostic message may include a synchronization header, a message header, data, and a cyclic redundancy check (CRC). In other examples, the data frame many include any other fields in addition to, or in place of, those listed above. The messaging layer 206 can receive the protocol agnostic data from the abstraction layer 208 and handle transmission of protocol agnostic messages that include the protocol agnostic data on the communication link. For example, if the communication link is an Ethernet link, the messaging layer 206 may receive the protocol agnostic messages and transmit the messages over the Ethernet link. Additionally, the messaging layer 206 may receive protocol agnostic messages from the communication link and provide the message data to the abstraction layer 208.

The abstraction layer 208 may be configured to genericize, for example, software initialization, input/output (IO) data representation, and event handling for the industrial protocol stacks, such as the industrial Ethernet protocol stack 210, and the TCP/IP stack 212. This abstraction may vary significantly from protocol to protocol. During system initialization, the application layer 204 may configure the communication layer 202 by sending protocol agnostic messages that indicate devices and/or items to be used for the application. For example, a device may be a data structure that contains identity information (for example, vendor ID, product code, and the like) while an item may be a data structure that describes input/output (IO) data (which may also be referred to as process data) and how it is represented to other entities on the network 102.

Upon indication from the application layer 204 to the communication layer 202 that configuration is complete, the communication layer 202 may process previously-added device and item structure data to configure the industrial Ethernet protocol stack 210 by modifying existing objects and creating new objects. This may be accomplished in a way that allows the application layer 204 to configure the identity and IO footprint of a system in an arbitrary way without the need for any software changes to the communication layer 202.

The abstraction layer 208 also acts as the application in the view of the industrial Ethernet protocol stack 210. For example, when an EtherCAT master sends new output data to the logical implementation 200, the abstraction layer 208 will receive the output data from the industrial Ethernet protocol stack 210 (via the EtherCAT native API) and then briefly store the data in a data table, for example, that represents the data in the form of data items. These items may be obtained using a common data object model. For example, the model may receive the output data from the industrial Ethernet protocol stack 210 as input and generate one or more data items as output. Each industrial network protocol may have a dedicated common data object model, or a single model may be used for all network protocols. In other examples, a lookup table or other data structure may be used to obtain data items from protocol specific data objects.

Once the data items are obtained from the protocol specific data objects, the data is no longer represented by an EtherCAT or other protocol specific object, but rather is represented by a protocol-agnostic data item according to the data items that were added to the system during the configuration phase, for example. For example, the common data object model may be initialized using the data items that were added during the configuration phase. The output data from the data object model is then copied from the data table and placed in one or more protocol-agnostic messages for transmission by the messaging layer 206 to the application layer 204. The messaging layer 206 may package the data items in any desirable format. The application layer 204 may then receive the protocol agnostic messages and process the output data according to the local configuration of the application layer 204.

Similarly, when the application layer 204 desires to produce data on the industrial Ethernet network, the application layer 204 sends one or more protocol agnostic messages that contain the input data to the communication layer 202. This data may be represented as item input data. On receipt of the messages by the communication layer 202, the messaging layer 206 forwards the input data contained in the messages to the abstraction layer 208. The abstraction layer 208 may briefly place the input data in a data table, for example, that stores the input data for each item. From there, the input data may be "unabstracted" by the abstraction layer 208 and supplied to the industrial Ethernet protocol stack 210 through the native EtherCAT API, for example. This may be accomplished using the common data object model or other data object model. The model may receive the data items as input and generate or otherwise output one or more protocol specific data objects. For example, if the unified network interface is connected to an EtherCAT network, the model may output EtherCAT objects using the received data items as input.

At this point, the input data is represented in terms of an EtherCAT object rather than a data item. At a proper point according to the EtherCAT protocol, for example, the input data is produced on the network for consumption by an EtherCAT master. While described with respect to EtherCAT, the communication layer 202 may be configured to perform these actions for several different Industrial Ethernet protocols, removing the need for the developer of the application to customize the data sent to and from the application layer 204 for each different network protocol. For example, one or more memory devices of the unified network interface 100 may store software that separately implements the communication layer 202 based on several respective different protocols. When integrating the unified network interface 100 with a particular network, the appropriate software can be loaded from the one or more memory devices to implement the respective communication layer 202.

Figure 3:
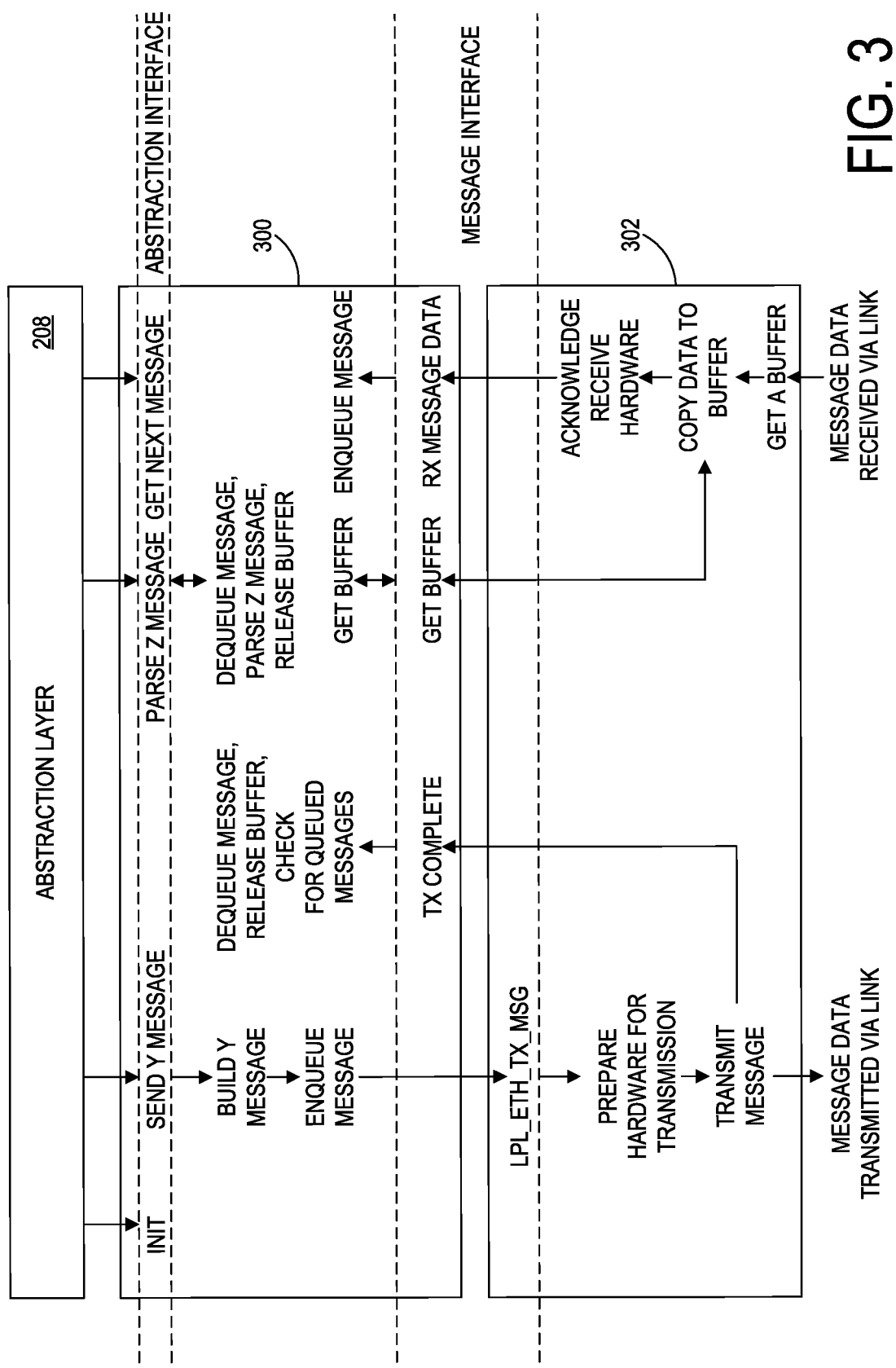
FIG. 3 is a process flow diagram illustrating a process flow for receiving and transmitting protocol agnostic messages over a communication link.

FIG. 3 is a process flow diagram illustrating and example process flow for the unified network interface 100. The process flow includes the abstraction layer 208, the unified interface stack 300, which implements functions for the abstraction layer 208 and the messaging layer 206, and the link porting layer 302, which handles lower level packaging and transmission of messages on each of several communication link types.

When the unified interface stack 300 receives an initialization function call "INIT" from the abstraction layer 208, the abstraction layer 208 expects upper layer software to provide a pointer to the link porting layer 302 message transmit function, a pointer to a "message ready" callback function, a pointer to a "critical section enter" function, and a pointer to a "critical section exit" function, for example. Subsequently, the unified interface stack 300 will initialize itself, store the link porting layer 302 message transmit function pointer for later use, and prepare to receive messages from the link porting layer 302.

The unified interface stack 300 can include a "SEND MESSAGE" function callable by the abstraction layer 208 for each message type of the protocol agnostic message format. This function is used by the unified interface stack 300 to allocate a buffer, then build and send the corresponding message through the link porting layer 302 to the application 104, as illustrated in the process flow. The message is sent using the message transmit function pointer supplied during initialization. The unified interface stack 300 can also include a "PARSE MESSAGE" function for each message type of the protocol agnostic message format to parse received messages from the application 104, for example. This function may take pointers to locations into which to place disassembled message information. In an example, a NULL pointer can be passed to the function to indicate message information that is not of interest to the caller. The "GET NEXT MESSAGE" function can be used to determine if there is a received message waiting and, if so, the type of the message. Knowing the type of message allows the caller to know which parsing function to call.

The unified interface stack 300 also includes an "RX MESSAGE DATA" function which is used to process received message data. This function may be used to notify the unified interface stack 300 that new message data has been written to an input buffer, the amount of data written to the input buffer, and that the data is ready for processing. If a sufficient number of message bytes were processed as part of this function call to complete one or more messages, those messages can be retrieved with the "GET MESSAGE" function of the unified interface stack 300.

For the example data flow illustrated in FIG. 3, the abstraction layer 208 makes an initialization function call to the unified interface stack 300 to initialize the stack and receive pointers to various functions for the unified interface stack 300. The abstraction layer 208 may then make a send message function call for a message "Y" to send the message Y using the unified interface stack 300. The unified interface stack 300 receives the send message function call and builds and enqueues the Y message.

Following enqueuing of the Y message, the unified interface stack calls the "LPL_ETH_TX_MSG" function from the link porting layer 302 to transmit the message via Ethernet. While illustrated as Ethernet, the unified interface stack 300 may call a different function for the link porting layer 302 for different communication link types. The link porting layer 302 then prepares the Ethernet hardware for transmission of the Y message and transmits the message via the Ethernet communication link to the application 104.

Following transmission of the message, the link porting layer 302 makes a TX COMPLETE function call to the unified interface stack 300 to indicate that the message was successfully transmitted via the communication link. In response to this function call, the unified interface stack 300 dequeues the message, releases the buffer, and checks for any further queued messages.

When receiving a message via the communication link, the link porting layer 302 allocates a buffer, copies the data for the message into the buffer, and provides an acknowledgement for the respective receiver hardware (e.g., Ethernet). Following receipt of the message, the link porting layer 302 calls the RX MESSAGE DATA function of the unified interface stack 300 which enqueues the message. The unified interface stack 300 also allocates a buffer for the received message. Once the message has been enqueued, the application 104 can call the GET NEXT MESSAGE function of the unified interface stack to identify the received message, such as a message "Z". Then, the unified interface stack 300 can call the "PARSE MESSAGE" function to consume the Z message. Following the PARSE MESSAGE call, the unified interface stack dequeues the Z message, parses the Z message, and releases the buffer holding the data for the Z message.

FIG. 4 is a chart illustrating an example protocol agnostic message format for a message 400. In some examples, the message field data may be presented on the communication link in big-endian format. In other examples, the data may be presented in any other manner. The synchronization header may contain a check code for the message transmission as well as a length (in bytes) of the data that follows. The check code field may contain a static 4-bit value (i.e. constant and always present) of 0b1010 or any other specified value and may be used to provide a "keying" point for detecting framing errors. Because this is a static value, all valid transmissions can be expected to have this check code in the most significant nibble. If the value of the check code is incorrect, a framing error has likely occurred, and the communication may be resynchronized.

The length field may contain a 12-bit value that indicates the number of bytes following the synchronization header. This provides the number of following bytes and, by extension, the relative starting point for the next transmission. Because a transmission error in the length field could be relatively catastrophic (due to follow-on framing errors), the inverse field may be used to verify that the length field is correct. The bit-wise inverse of the check code and the length fields follow the check code and length fields. When a transmission is received and processed, the check code and length fields can be checked against the expected values for the corresponding inverse fields to determine if the length is correct. If the inverse fields are as expected, processing of the message 400 can continue normally. If not, the system can begin the resynchronization process.

The message header type field distinguishes one message type from another. this field also indicates the purpose or meaning of the message (e.g. "get IP settings" or "set device") and the following data. This field may always be interpreted as an unsigned 8-bit number. The flags field may indicate information on how the message 400 should be processed. The data length field may contain a value that indicates the length of the data field. For example, the data length field may indicate the number of bytes after the data length field and before the CRC field. This field may always be interpreted as an unsigned 16-bit number.

The data field contains the information specific to the message 400 indicated by the type field. Inside the data field are zero or more fields that contain message-specific information. The interpretation of these fields is dependent on the message type being parsed. For example, a message that requests that an item be added to the system may have two fields in the message data field: one for the item ID and another for the location into which the item should be installed.

The CRC field contains the CRC on all of the bytes in the message 400. The algorithm to compute the CRC may be CRC-16 (Modbus) or any other CRC algorithm. In some examples, the transmitting side of a message may use a CRC value of 0xA34D or other pre-specified value to indicate to the receiving side not to verify the CRC. This can be used during evaluation or troubleshooting to improve throughput by not spending processing bandwidth on computation of the CRC.

Figure 5:
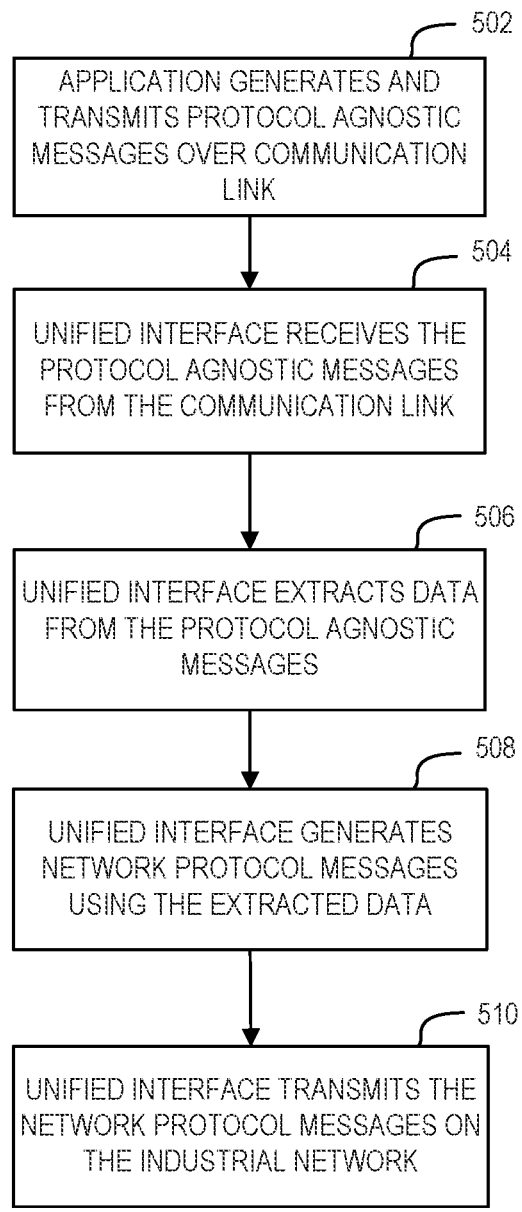
FIG. 5 is a flowchart illustrating a method of generating industrial network messages using data from protocol agnostic messages for transmission on the industrial network.

FIG. 5 is a flowchart illustrating a method 500 of generating industrial network messages using data from protocol agnostic messages for transmission on the industrial network. At step 502, an application, such as the application 104, produces data that the application wishes to provide on the industrial network, which may be an industrial Ethernet network. The data may be provided using protocol agnostic messages, which may be packaged by the application and transmitted to a unified network interface over a communication link.

At step 504, a messaging layer of the unified network interface receives the protocol agnostic messages from the communication link. At step 506, data is extracted from the protocol agnostic messages. For example, data from the protocol agnostic messages may be provided to an abstraction layer implemented by the unified network interface from a messaging layer. At step 508, the unified network interface generates messages for the network using the data extracted from the protocol agnostic messages. Knowing the network protocol, the abstraction layer implemented by the unified network interface may place the data extracted from the protocol agnostic messages into data objects. This may be accomplished using a data object model, one or more data tables, and/or other data structures maintained in one or more memory units of the unified network interface. The data objects may be provided to a network protocol stack of the industrial network using an API of the network protocol stack, which may generate messages for transmission on the network. At step 510, the network protocol messages are transmitted on the industrial network.

Figure 6:
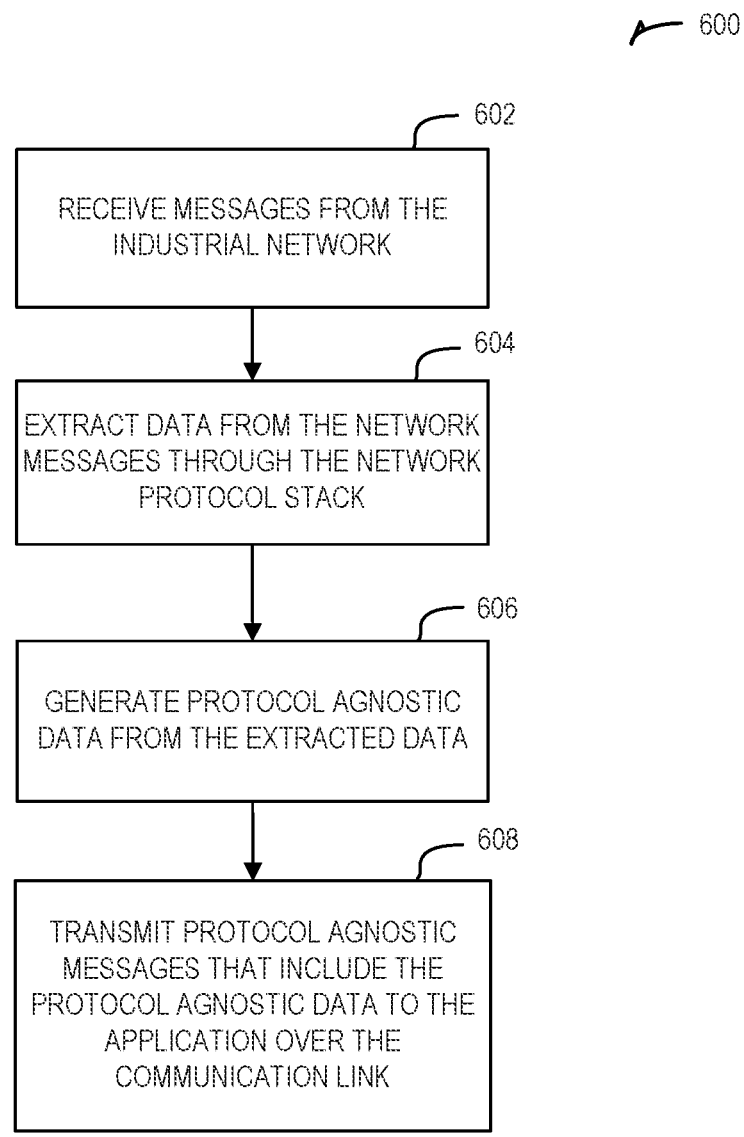
FIG. 6 is a flowchart illustrating a method of generating protocol agnostic messages using data from industrial network messages for transmission to an application.

FIG. 6 is a flowchart illustrating a method 600 of generating protocol agnostic messages using data from industrial network messages for transmission to an application. At step 602, data intended for an application is received from an industrial network, such as an industrial Ethernet network. The data may be packaged in one or more messages having a format designated for the protocol of the industrial network. At step 604, an abstraction layer implemented by the unified network interface receives data objects through an API of the network protocol stack of the industrial network. The data objects contain the data from the network intended for the application.

At step 606, data items that include protocol agnostic data are generated from the data objects for transmission to the application. This may be accomplished using one or more data object models, data tables, and/or other data structures maintained in one or more memory units of the unified network interface. At step 608, the data items that include protocol agnostic data may be packaged into protocol agnostic messages by a messaging layer. The protocol agnostic messages may then be transmitted by the messaging layer to the application over the communication link.

Figure 7:
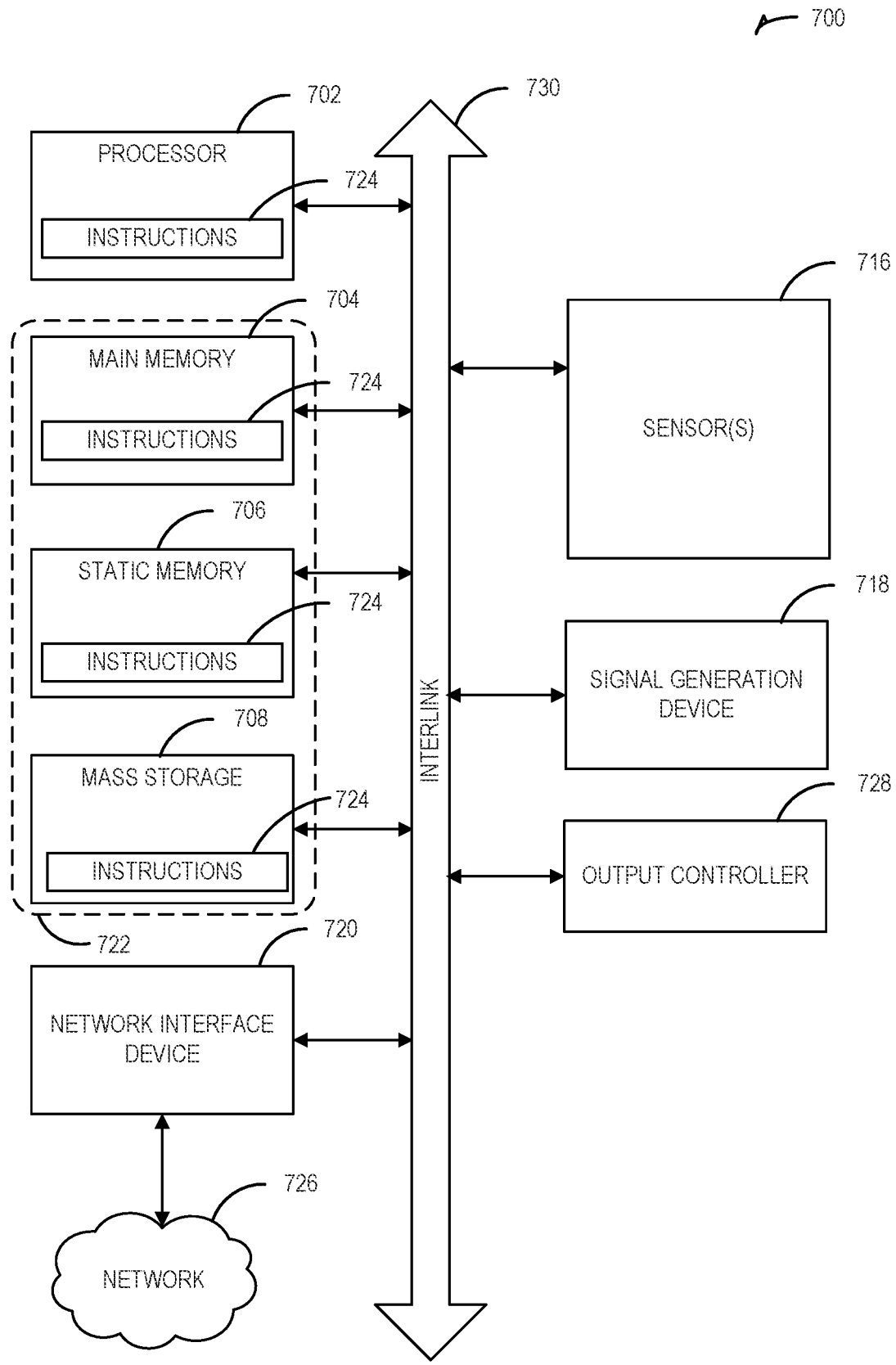
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. For example, the machine 700 can be any one or more of the unified network interface 100 and the application 104. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which may communicate with each other via an interlink (e.g., bus) 730. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In an example, the network interface device 720 may include one or more physical jacks (e.g., Ethernet) to connect to the communications network 726.

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system for interfacing an application circuit to an industrial network, the industrial network having a specified message format for messages transmitted on the industrial network, the system comprising:
    a first interface connected to the industrial network to transmit signals on, and receive signals from, the industrial network;
    a second interface connected to a communication link to transmit signals on, and receive signals from, the communication link to communicate data with the application circuit;
    one or more controllers; and
    one or more memory devices storing instructions, which when executed, cause the controllers perform operations comprising:
    extracting network data packaged in messages of the specified message format received via the first interface;
    generating messages in a protocol agnostic format different than the specified message format, wherein the protocol agnostic format is a same format for a plurality of different link types of the communication link;
    transmitting the messages in the protocol agnostic format on the communication link via the second interface;
    extracting link data packaged in messages having the protocol agnostic format received from the application circuit via the second interface;
    generating messages in the specified message format that include the link data; and
    transmitting the message in the specified format to the industrial network via the first interface,
    wherein the one or more controllers are configured to implement a communication layer that comprises an abstraction layer and a messaging layer, the abstraction layer configured to interface with an application programming interface of a protocol stack of the industrial network, and wherein the operation of extracting network data packaged in the messages of the specified message format comprises:
    receiving, using the abstraction layer, data objects comprising the network data from the application programming interface of the protocol stack of the industrial network; and
    generating, by the abstraction layer, a plurality of data items from the data objects, the plurality of data items encapsulating the network data.

2. The system of claim 1, wherein the second interface comprises a plurality of pins configured to indicate the one of the plurality of different link types, and wherein the one or more controllers are configured to identify the one of the plurality of different link types based on the plurality of pins.

3. The system of claim 2, wherein the one of the plurality of different link types is one of Universal Asynchronous Receiver/Transmitter (UART), Ethernet, Inter-Integrated Circuit (I2C), or Serial Peripheral Interface (SPI).

4. The system of claim 1, wherein the messaging layer is configured to interface with the application circuit via the communication link, and wherein the operation of generating messages in the protocol agnostic format for the second interface comprises:
    generating the messages in the protocol agnostic format using the plurality of data items from the abstraction layer; and
    transmitting, by the messaging layer, the generated messages on the communication link.

5. The system of claim 1, wherein the messaging layer configured to interface with the application circuit via the communication link, and wherein the operation of extracting link data received in messages from the second interface comprises:
    receiving, using the messaging layer, the messages in the protocol agnostic format from the communication link; and
    extracting data items from the received messages in the protocol agnostic format.

6. The system of claim 5, wherein the operation of generating messages in the specified message format for the first interface comprises:
    forming, by the abstraction layer, data objects using the data items received from the messaging layer, the data objects having a format interpretable by the protocol stack of the industrial network; and
    providing the data objects to the protocol stack of the industrial network through the application programming interface of the protocol stack.

7. A method for providing an interface between an industrial network and an application circuit, the industrial network having a specified message format for messages transmitted on the industrial network according to a protocol of the industrial network, the method comprising:
    receiving, by a unified interface circuit, messages from the industrial network in the specified message format;
    extracting network data from the messages using the protocol of the industrial network;
    generating one or more messages in a protocol agnostic format different than the specified message format; and
    transmitting, over a communication link, the one or more messages in the protocol agnostic format from the unified interface circuit to the application circuit separate from the unified interface circuit, wherein the protocol agnostic format is a same format for a plurality of different link types of the communication link,
    wherein the unified network interface is configured to implement a communication layer that comprises an abstraction layer and a messaging layer, the abstraction layer configured to interface with an application programming interface of a protocol stack of the industrial network, and wherein extracting the data from the messages based on the protocol of the industrial network comprises:

receiving, using the abstraction layer, data objects from the protocol stack of the industrial network, the data objects including the network data from the messages in the specified message format; and forming, by the abstraction layer a plurality of data items from the data objects.

8. The method of claim 7, wherein providing, over the communication link, the plurality of messages in the protocol agnostic format comprises:

identifying, by one or more controllers of the unified network interface, the link type for the communication link; and transmitting the messages in the protocol agnostic format using the identified link type according to a lower layer hardware interface for the identified link type.

9. The method of claim 8, wherein identifying the link type comprises reading a state of a plurality of pins connected to the unified interface circuit to identify the link type.

10. The method of claim 8, wherein the identified link type is one of Universal Asynchronous Receiver/Transmitter (UART), Ethernet, Inter-Integrated Circuit (I2C), or Serial Peripheral Interface (SPI).

11. The method of claim 7, wherein the messaging layer is configured to interface with the application circuit via the communication link, and wherein generating the one or more messages in the protocol agnostic format different than the specified message format comprises:

generating, by the messaging layer, the messages in the protocol agnostic format using the plurality of data items from the abstraction layer.

12. The method of claim 7, wherein forming the plurality of data items from the data objects comprises:

providing the data objects as input to a data object model implemented by the abstraction layer; and receiving the plurality of data items as output from the data object model.

13. The method of claim 7, wherein the protocol of the industrial network is one of EtherCAT, EtherNet/IP, process field network (PROFINET), Ethernet Powerlink, Sercos III, CC-Link, or Modbus TCP.

14. A method of providing an interface between an application circuit and an industrial network, the industrial network having a specified message format for messages transmitted on the industrial network according to a protocol of the industrial network, the method comprising:

receiving, by a unified interface circuit, messages having a protocol agnostic format from an application circuit separate from the unified interface circuit and over a communication link, wherein the protocol agnostic format is a same format for a plurality of different link types for the communication link;

extracting one or more data items from the messages having the protocol agnostic format;

generating a plurality of network messages in the specified message format for the protocol of the industrial network, the plurality of network messages generated using the data items; and transmitting, by the unified interface circuit, the plurality of network messages on the industrial network, wherein the unified network interface is configured to implement a communication layer that comprises an abstraction layer and a messaging layer, the messaging layer configured to interface with the application circuit, and wherein receiving the messages having the protocol agnostic format from the application circuit comprises:

receiving, by the messaging layer, the messages having the protocol agnostic format from the communication link through a link porting layer, wherein the link porting layer is configured to implement lower layer hardware interfacing for each of the plurality of different link types for the communication link.

15. The method of claim 14, wherein the abstraction layer is configured to interface with an application programming interface of a protocol stack of the industrial network, and wherein generating the plurality of network messages comprises:

forming, by the abstraction layer, data objects using the data items, the data objects in a format specified for the application programming interface of the protocol stack; and providing the data objects to the protocol stack of the industrial network via the application programming interface.

16. The method of claim 15, wherein forming the data objects using the data items comprises:

providing the data items as input to a data object model implemented by the abstraction layer; and receiving the data objects as output from the data object model.

17. The method of claim 14, wherein the protocol of the industrial network is one of EtherCAT, EtherNet/IP, process field network (PROFINET), Ethernet Powerlink, Sercos III, CC-Link, or Modbus TCP.

* * * * *